United States Patent
Locke et al.

(10) Patent No.: US 9,088,166 B2
(45) Date of Patent: Jul. 21, 2015

(54) EXTERNAL CHARGING PACK AND MEDICAL DEVICE WITH INTERNAL BATTERY RECHARGABLE FROM EXTERNAL CHARGING PACK

(75) Inventors: Kelly J. Locke, Woodinville, WA (US); Richard J. Cardin, Duvall, WA (US)

(73) Assignee: PHYSIO-CONTROL, INC., Redmond, WA (US)

( * ) Notice: Subject to any disclaimer, the term of this patent is extended or adjusted under 35 U.S.C. 154(b) by 1234 days.

(21) Appl. No.: 10/136,040

(22) Filed: Apr. 30, 2002

(65) Prior Publication Data

US 2003/0201752 A1   Oct. 30, 2003

(51) Int. Cl.
H02J 7/14      (2006.01)
H02J 7/00      (2006.01)

(52) U.S. Cl.
CPC ...................... *H02J 7/0042* (2013.01)

(58) Field of Classification Search
USPC ............ 320/103, 107, 112, 114, 115; 307/64, 307/66, 150; 607/5
See application file for complete search history.

(56) References Cited

U.S. PATENT DOCUMENTS

| | | | |
|---|---|---|---|
| 2,530,587 A * | 11/1950 | Sorensen ..................... 307/150 |
| 4,590,943 A | 5/1986 | Paull et al. |
| D295,739 S | 5/1988 | Lanci et al. |
| 5,224,870 A | 7/1993 | Weaver et al. |
| D349,483 S | 8/1994 | Weaver et al. |
| 5,350,317 A | 9/1994 | Weaver et al. |
| 5,407,444 A * | 4/1995 | Kroll ................................ 607/5 |
| 5,565,756 A * | 10/1996 | Urbish et al. ................. 320/103 |
| 5,658,316 A * | 8/1997 | Lamond et al. .................... 607/5 |
| 5,741,305 A | 4/1998 | Vincent et al. |
| 5,868,790 A * | 2/1999 | Vincent et al. .................... 607/5 |
| 5,977,747 A * | 11/1999 | Huang ........................... 320/115 |
| 5,983,137 A * | 11/1999 | Yerkovich .......................... 607/5 |
| 6,038,473 A * | 3/2000 | Olson et al. ....................... 607/5 |
| 6,072,299 A | 6/2000 | Kurle et al. |
| 6,091,224 A * | 7/2000 | Morita ........................... 320/113 |
| 6,127,063 A | 10/2000 | Kowalsky et al. |
| 6,137,261 A | 10/2000 | Kurle et al. |
| 6,154,007 A * | 11/2000 | Shaver et al. .................. 320/116 |
| 6,184,654 B1 * | 2/2001 | Bachner et al. ................ 320/114 |
| 6,198,253 B1 * | 3/2001 | Kurle et al. .................... 320/132 |
| 6,236,187 B1 * | 5/2001 | Chen ............................... 320/113 |
| 6,249,105 B1 * | 6/2001 | Andrews et al. ............. 320/106 |
| 6,288,518 B1 * | 9/2001 | Yang et al. ..................... 320/103 |
| 6,319,053 B1 * | 11/2001 | Andrews et al. ............. 439/500 |
| 6,583,601 B2 * | 6/2003 | Simoes et al. ................. 320/114 |
| 6,591,135 B2 * | 7/2003 | Palmer et al. ..................... 607/5 |
| 6,639,381 B2 * | 10/2003 | Tamura et al. ................ 320/103 |
| 6,693,431 B1 * | 2/2004 | Leyde et al. .................. 324/434 |
| 6,709,784 B2 * | 3/2004 | Resch et al. ................... 429/123 |
| 7,038,333 B2 * | 5/2006 | Bourilkov et al. .............. 307/46 |
| 2002/0039016 A1 * | 4/2002 | You et al. ...................... 320/115 |

* cited by examiner

*Primary Examiner* — Jeffrey Sterrett
(74) *Attorney, Agent, or Firm* — Marger Johnson & McCollom, P.C.

(57) ABSTRACT

A replaceable, stand-alone charging apparatus for insertion into a portable electronic device having an energy storage device and a rechargeable battery that supplies energy to the energy storage device is provided. The replaceable, stand-alone charging apparatus has a body and a battery charging device housed substantially with the body and operable to charge the rechargeable battery of the portable electrical device. The replaceable, stand-alone charging apparatus further has an electrical connector adapted for connection with a cooperative electrical connector coupled to the rechargeable battery of the portable electronic device. The electrical connector is in electrical communication with the battery charging device.

21 Claims, 7 Drawing Sheets

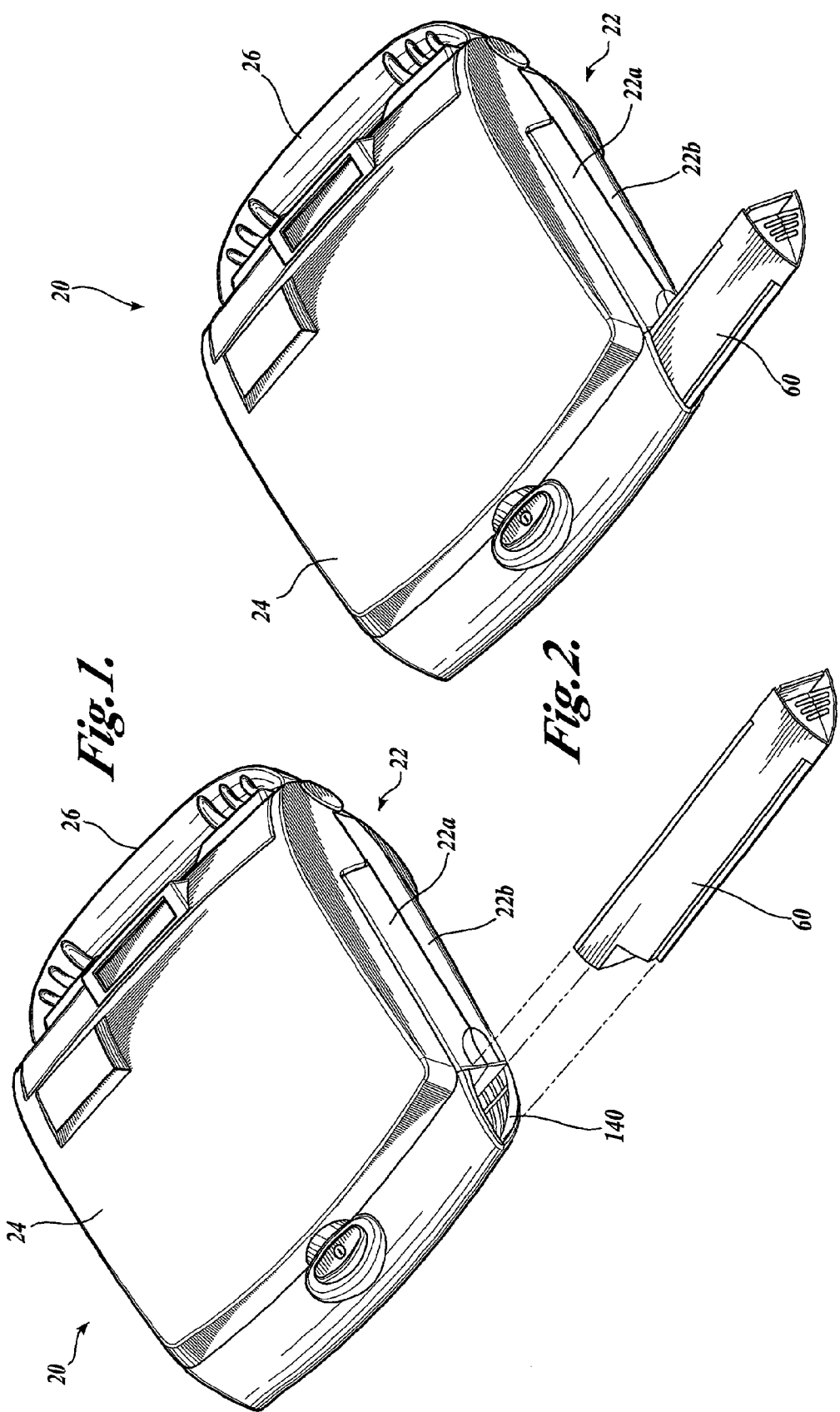

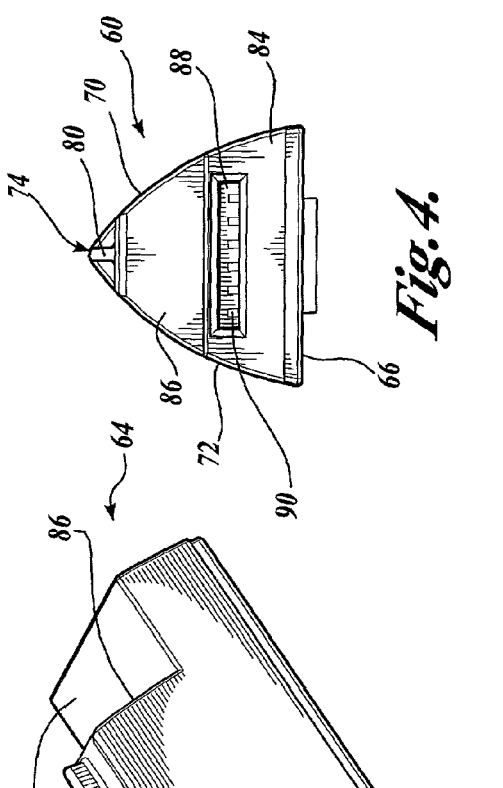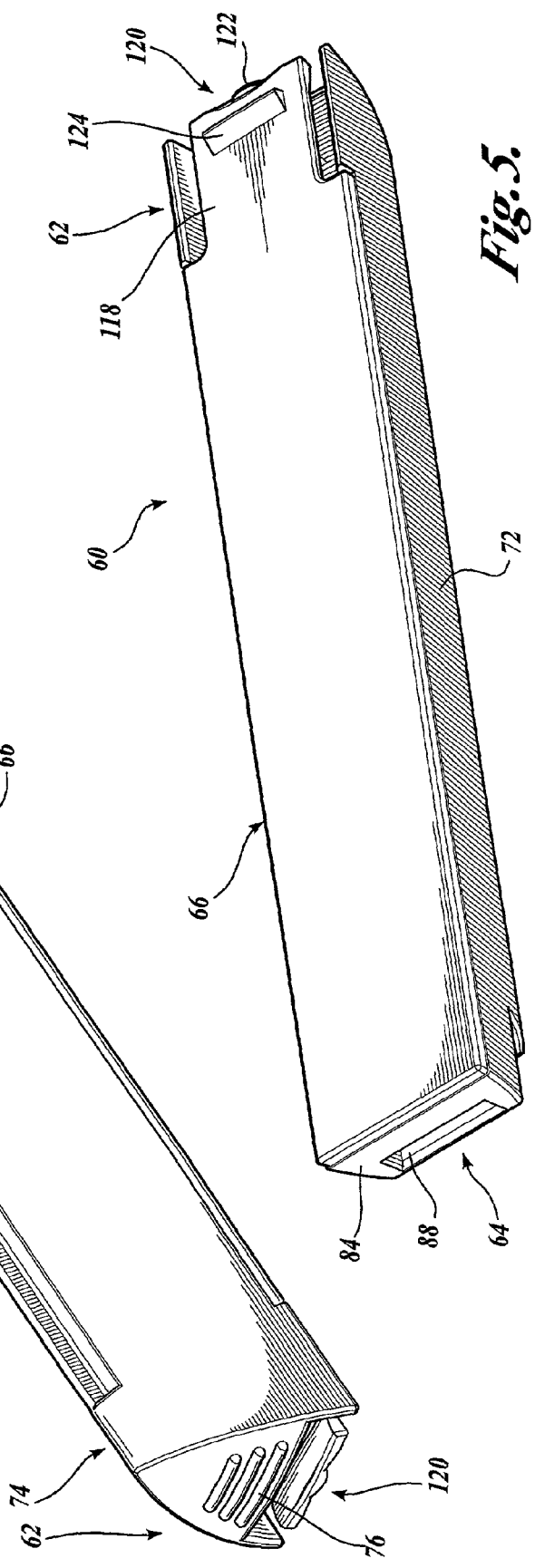

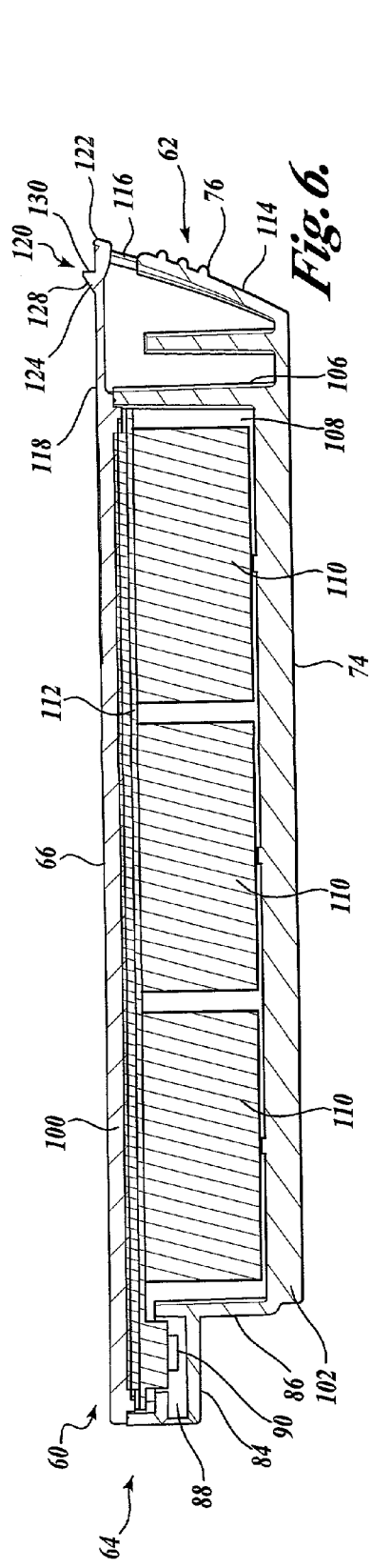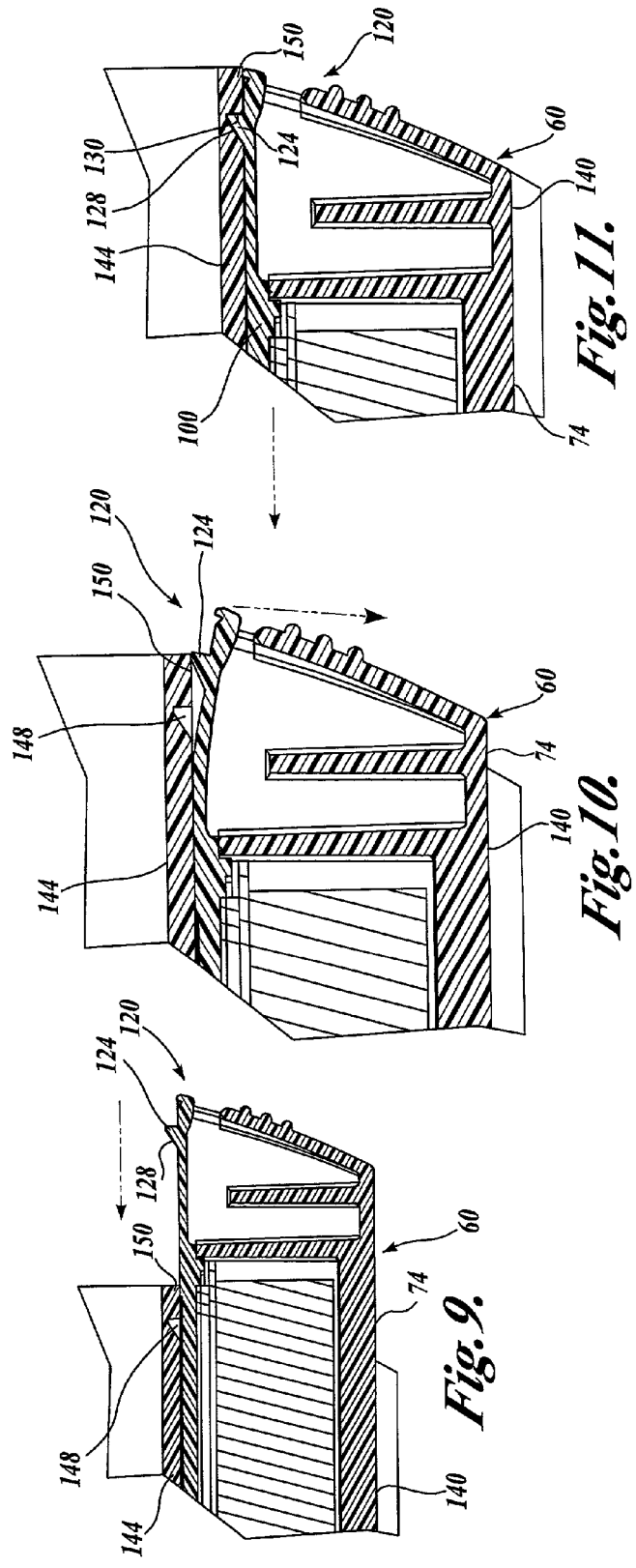

EXTERNAL CHARGING PACK AND MEDICAL DEVICE WITH INTERNAL BATTERY RECHARGABLE FROM EXTERNAL CHARGING PACK

FIELD OF THE INVENTION

The present invention is directed to charging packs for recharging a power source of a portable electronic device, and more particularly, to charging packs for recharging the power source of portable external defibrillators.

BACKGROUND OF THE INVENTION

The current trend in the medical industry is to make lifesaving portable medical devices, such as portable external defibrillators, more widely accessible to non-medical personnel. As the availability of portable medical devices increases, it is expected that more places will have these devices for use in emergency situations, such as in homes, police cars, worksites, and public gathering places.

There are several types of known portable external defibrillators, some of which are commonly referred to as automatic and semi-automatic defibrillators. An automatic defibrillator monitors and analyzes electrocardiogram (ECG) of the patient once the electrodes of the defibrillators are connected to a patient and, based on the ECG analysis, automatically delivers a defibrillation shock to the patient through the electrodes without user intervention. On the other hand, semi-automatic defibrillators operate such that once the ECG analysis indicates that defibrillation is recommended, an operator is prompted to manually trigger delivery of a defibrillation shock to the patient by depressing a triggering mechanism, such as a shock button. In either case, the portable external defibrillator must contain or be connected to an energy source to generate and apply a defibrillation pulse to the fibrillating patient. To ensure true portability, most portable external defibrillators are constructed with a removable battery pack, which rests within a battery well positioned in the defibrillator body. The battery pack is constructed to supply sufficient power to operate the portable external defibrillator for a period of time. The battery pack may be either rechargeable or non-rechargeable, depending on the user's preference and the environment in which the defibrillator is to be used. One such battery pack is described in U.S. Pat. No. 5,868,790 to Vincent at el., and is presently assigned to Medtronic Physio-Control Manufacturing Corporation of Redmond, Wash.

While battery packs are successful in their present application, the overall configuration of utilizing removable battery packs as the power source of portable external defibrillators poses several deficiencies. For instance, as is well known in the art, a portable external defibrillator is unusable as a medical treatment device without the battery pack or with a battery pack that is discharged. In most situations, changing or recharging the battery pack will typically occur during normal testing of the defibrillator in a non-emergency setting. In the case of recharging the battery pack, a separate charging station is required, which is sometimes prohibitively expensive. If the user does not have a charging station, the user must have the battery pack charged and conditioned by a servicing center, prior to which time the portable external defibrillator is without a power source and will not operate if needed. To remedy this situation, additional battery packs must be purchased, which increases the overall operating costs associated with operating portable external defibrillators.

Additionally, a current user may have to change the battery pack at the site of the emergency. For example, a prior user of the defibrillator may have left a discharged battery pack in the device that is not discovered until treatment is to be initiated on a patient. Alternatively, the defibrillator could be in use when the battery pack becomes discharged, requiring the current user to replace the battery pack before continuing treatment. In either case, replacing the discharged battery pack with a charged battery pack increases the total time required to deliver treatment to the patient. Furthermore, these additional battery packs must also be purchased and charged, which again, increases the overall cost of operating the portable external defibrillator.

SUMMARY OF THE INVENTION

The present invention is directed to a selectively removable charging pack that is operable to recharge the power source of a portable external defibrillator when coupled thereto, so as to overcome the deficiencies of the prior art.

In accordance with one embodiment of the present invention, a replaceable, stand-alone charging apparatus is provided for insertion into a portable electronic device having an energy storage device and a rechargeable battery that supplies energy to the energy storage device. The charging apparatus comprises a body and a battery charging device housed substantially within the body and operable to charge the battery of the portable electrical device. The charging apparatus further comprises an electrical connector adapted for connection with a cooperative electrical connector coupled to the rechargeable battery of the portable electronic device. The electrical connector is in electrical communication with the battery charging device.

In accordance with another embodiment of the present invention, a replaceable, stand-alone charging apparatus is provided that is capable of connection to a portable external defibrillator having an energy storage device and a rechargeable battery that supplies energy to the energy storage device. The charging apparatus comprises a body and a battery charging device housed substantially within the body and operable to charge the rechargeable battery of the portable external defibrillator. The charging apparatus further comprises a latch, which is disposed at approximately one end of the body. The latch is movable between an extended position and a retracted position. The latch is biased in the extended position.

In accordance with still another embodiment of the present invention, a portable, stand-alone insertable charging pack for charging a battery substantially affixed to a portable external defibrillator and supplying energy to an energy storage device of the portable external defibrillator is provided. The charging pack comprises a body having proximal and distal ends. The body is formed by a base portion and a cover portion. A battery charging device is provided that is positioned within the base portion and operable to charge the battery of the portable external defibrillator. The charging pack further comprise a latch formed from a portion of the cover and located at the distal end of the body. The latch is movable between an extended position and a retracted position, and is biased in the extended position. When the charging pack is partially inserted into the portable external defibrillator, the latch moves to the retracted position. The latch returns to the extended position after the charging pack is fully inserted in a portable external defibrillator.

In accordance with still yet another embodiment of the present invention, a portable, stand-alone charging apparatus is provided that is capable of connection to a portable external defibrillator having an energy storage device and a rechargeable battery that supplies energy to the energy storage device. The charging apparatus comprises a body and means for charging the rechargeable battery of the portable external defibrillator. The means for charging is disposed within the body. The charging apparatus also comprises means for transferring power from the charging means to the rechargeable battery of the portable external defibrillator.

In accordance with still yet another embodiment of the present invention, a portable external defibrillator device of the type having a body which houses defibrillator components comprising defibrillator circuitry, an energy storage device and a rechargeable battery for supplying energy to the energy storage device is provided. The improvement thereto comprises a charging well provided in the body of the portable external defibrillator and a charging apparatus selectively removable from within the charging well. The charging apparatus comprises a body having a battery charging device operable to charge the rechargeable battery of the portable external defibrillator device. The charging apparatus further comprises an electrical connector coupled to the body of the charging apparatus and in electrical communication with the battery charging device.

In accordance with yet still another embodiment of the present invention, a portable external defibrillator system is provided. The portable external defibrillator system comprises defibrillator circuitry, an energy storage device and a rechargeable battery that provides energy to the energy storage device, and a body for housing the defibrillator circuitry, the energy storage device and the rechargeable battery. The portable external defibrillator system also comprises a selectively removable charging apparatus that comprises a body having a battery charging device operable to charge the rechargeable battery of the portable external defibrillator system. The charging apparatus further includes a latch that is movable between an extended position and a retracted position. The latch is biased in the extended position. The portable external defibrillator system further includes a charging well provided in the body of the defibrillator into which the selectively removable charging apparatus is inserted. The charging well includes a side wall, a portion of which is operable to contact the latch of the charging apparatus as the charging apparatus is inserted into the charging well.

In accordance with yet a further embodiment of the present invention, a portable external defibrillator system is provided. The portable external defibrillator system comprises defibrillator circuitry, an energy storage device and a rechargeable battery that supplies energy to the energy storage device, and a body for housing the defibrillator circuitry, the energy storage device and the rechargeable battery. The portable external defibrillator system also comprises a selectively removable charging apparatus that comprises a charging apparatus body and a battery charging device operable to charge the rechargeable battery of the portable external defibrillator system. The portable external defibrillator system also comprises a charging well provided in the defibrillator body into which the removable charging apparatus is inserted.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 1 is a top perspective view of one embodiment of a portable external defibrillator formed in accordance with the present invention, illustrating a charging pack selectively removed from a charging well;

FIG. 2 is a top perspective view of the portable external defibrillator of FIG. 1, illustrating the charging pack partially inserted into the charging well;

FIG. 3 is a bottom front perspective view of one embodiment of a charging pack constructed in accordance with the present invention;

FIG. 4 is a rear view of the charging pack of FIG. 3;

FIG. 5 is a top rear perspective view of the charging pack of FIG. 3;

FIG. 6 is a longitudinal cross-section view of the charging pack of FIG. 3;

FIGS. 9, 10 and 11 are cross-section views of the charging pack and charging well, depicting the operation of a latch to secure the charging pack within the charging well.

DETAILED DESCRIPTION OF THE PREFERRED EMBODIMENT

While the present invention was developed to re-charge a power source (e.g., a battery) located in a portable external defibrillator, it is to be understood that the invention can be used in other electrical devices requiring or desiring battery charging capability, such as cordless tools and portable appliances. Thus, the following description relating to portable extended defibrillators is meant to be illustrative and not limiting to the broadest scope of the inventions, as claimed.

Prior to describing an exemplary embodiment of a charging pack, a brief discussion of the nature and operation of one type of portable external defibrillator suitable for incorporating the present invention is set forth. In this regard, attention is directed to FIGS. 1-2, which illustrate selected components of a portable external defibrillator 20. Generally described, the portable external defibrillator 20 includes a housing 22 and a lid 24. The lid 24 is pivotally coupled to the housing 22 so that the lid 24 can be opened to reveal a defibrillator control panel having defibrillator components, such as a shock button. The housing 22 is formed by top and bottom housing sections 22A and 22B such that when assembled, the housing sections mate to form a shell to house all of the electrical components of the defibrillator 20. The housing sections 22A and 22B are connected together by any known mechanical fastener, such as snap-lock assemblies or screws. As will be described in more detail below, one embodiment of a charging pack is described that aids in securing the housing sections together.

Figure 12:
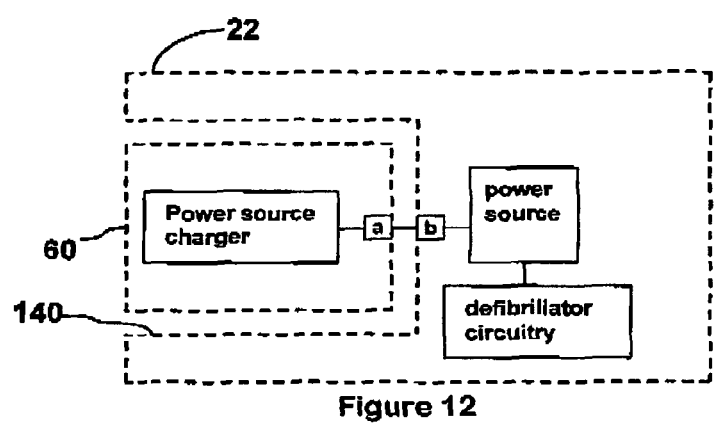
FIG. 12 is a schematic block diagram showing electrical components, with the housings for the charge pack and defibrillator shown in phantom.

The electronic components of the defibrillator 20 include, but are not limited to, a controller, a charging circuit, an energy storage device, and an output circuit. These components (shown in block form in FIG. 12 as defibrillator circuitry) are typically utilized in conventional defibrillators, and thus will not be described in any more detail. Power for the defibrillator 20 is provided by a power source (see FIG. 12) in the form of rechargeable cells securely located within the housing 22 of the defibrillator 20. The electrical components of the defibrillator 20 also include a selectively removable charging pack 60 mounted within a charging well 140 of the defibrillator 20. When placed within the charging well 140, the charging pack 60 is operable to recharge the power source so that the defibrillator 20 may deliver the requisite charge. While in the embodiment shown the charging pack 60 is inserted into the charging well 140 of the defibrillator 20, it will be apparent that the defibrillator 20 and charging pack 60 may be configured so that the charging pack 60 can be coupled externally to the defibrillator 20, if desired.

To facilitate use, the defibrillator 20 may be formed from impact-resistant plastic and includes an integral handle 26 to allow the user to easily carry the defibrillator to the desired location. In operation, the defibrillator 20 is preferably positioned so that the control panel (hidden by the lid 24) is oriented upwards toward the user. The control panel contains a user interface that allows the user to operate the defibrillator after the defibrillator is connected to the patient via a pair of electrodes (not shown). As is well known in the art, under the control of the controller, the charging circuit transfers energy from the power source to the energy storage device, and the output circuit transfers energy from the energy storage device to the electrodes. In the case of a semi-automatic version of the defibrillator, a shock key is depressed by the operator to trigger application of a defibrillation shock to the patient.

One suitable embodiment of a charging pack 60 formed in accordance with the present invention is illustrated in FIGS. 3-6 and comprises an elongate body of generally triangular shaped cross section having a front region 62, a back region 64, a top region 66, and left and right sides 70 and 72, that form a bottom region 74 at the convergence of left and right sides. The front region 62 of the charging pack is formed with a latch 120 which may be utilized by a user to remove the charging pack from the defibrillator. As will be discussed in detail below, the latch 120 automatically secures the charging pack 60 in the charging well when the charging pack 60 is inserted into the defibrillator. The front region 62 of the charging pack 60 is suitably formed so that when the charging pack 60 is inserted into the defibrillator, the front region 62 of the charging pack 60 is substantially flush with the side of the defibrillator. The front region 62 may also include ridges 76 disposed on the front surface of the charging pack 60 that provide gripping surfaces for a user's fingers when the charging pack 60 is pushed into place within the charging well.

As best shown in FIGS. 3 and 4, the bottom region 74 of the charging pack 60 includes an in-cut ridge 80 that is formed into the bottom surface of the charging pack 60 and extends along the length of the charging pack. As will be described in more detail below, the ridge 80 is disposed within a slot formed by the flange members of the housing sections when the charging pack 60 is inserted into the charging well of the defibrillator. Accordingly, the ridge 80 of the charging pack 60 aids in securing the housing sections together.

Figure 7A:
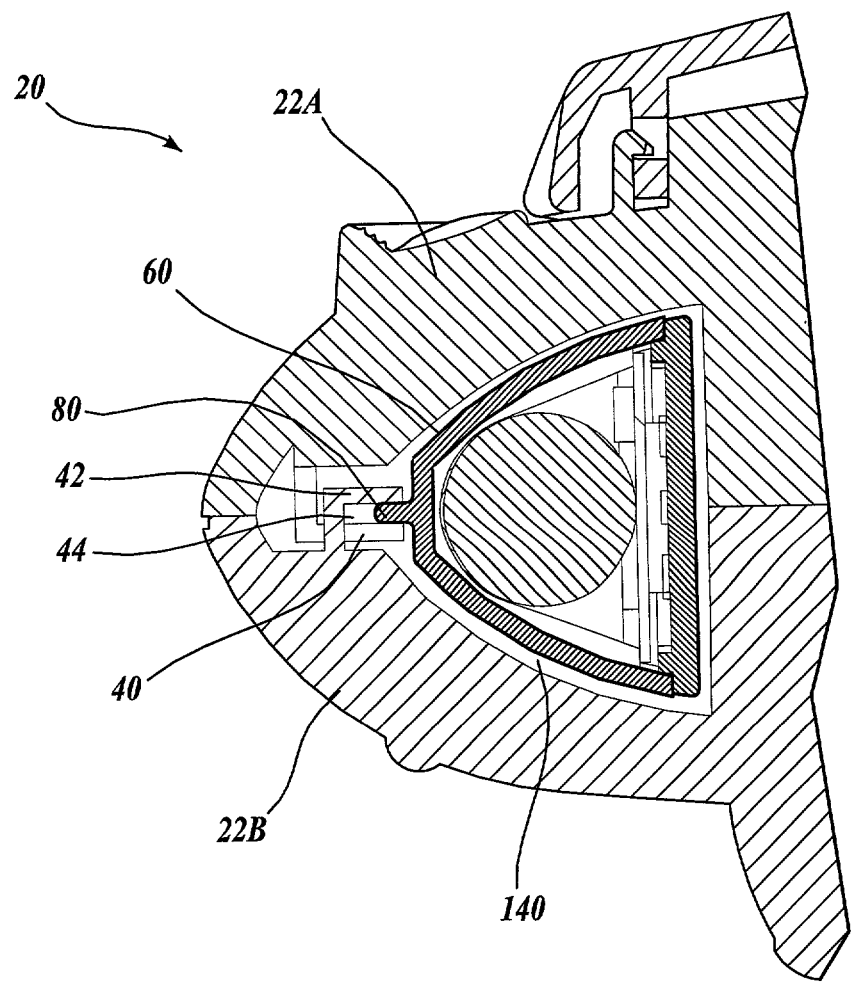
FIG. 7A is a partial cross-section view of a schematic representation of the portable external defibrillator of FIG. 1 showing the charging pack of FIG. 3 within the charging well.

In accordance with one aspect of the present invention, the charging pack aids in securing the top housing section to the bottom housing section. FIG. 7A is a partial side view of a schematic representation of the defibrillator 20 depicting the charging well 140. As shown in FIGS. 1 and 7A, the charging well 140 is positioned at the front of the defibrillator 20 and is formed by the mating of the housing sections 22A and 22B. The top housing section 22A includes flange members 40 that are spaced-apart and extend along the longitudinal axis of the charging well 140. Similarly, the bottom housing section 22B includes flange members 42 that are spaced-apart and extend along the longitudinal axis of the charging well 140. The flange members 40 and 42 are disposed at the front of the charging well and protrude slightly into the charging well 140. The flanges 40 and 42 are adapted to mate as interlocking fingers, which define a slot 44 for receiving the ridge 80 of the charging pack 60. When the charging pack is inserted into the charging well, the ridge 80 of the charging pack 60 slides into the slot 44 formed by the flange members 40 and 42. Once the charging pack 60 is fully inserted into the charging well 140, the ridge 80 of the charging pack 60 prevents the top housing section 22A from separating from the bottom housing section 22B, as shown in FIG. 7A.

Figure 7B:
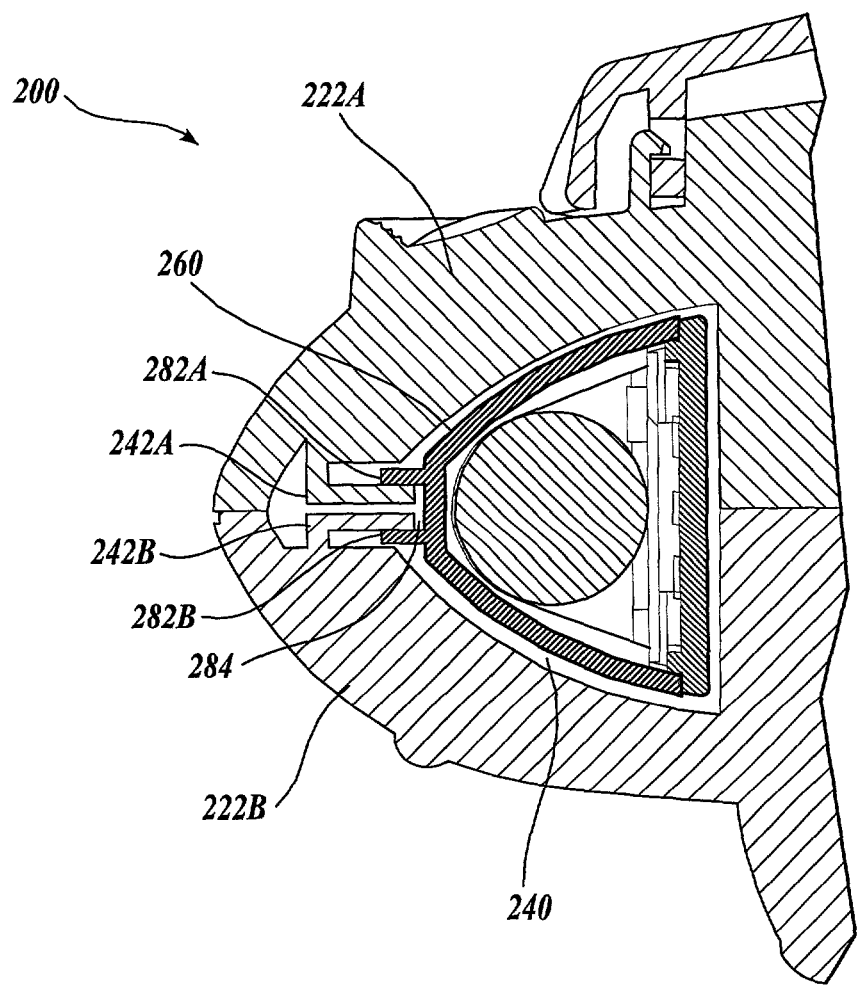
FIG. 7B is a partial cross-section view of a schematic representation of another embodiment of a defibrillator charging pack inserted into a portable external defibrillator for aiding in securing the top housing section of the portable external defibrillator to the bottom housing section of the portable external defibrillator.

FIG. 7B is a partial cross-section view of a schematic representation of another embodiment of a defibrillator charging pack inserted into a portable external defibrillator for aiding in the securement of the top housing section to the bottom housing section. The construction and operation of the defibrillator 200 and charging pack 260 are similar to that of the defibrillator 20 and charging pack 60, respectively, except for the differences that will now be described in detail. As best shown in FIG. 7B, the ridge of the charging pack shown in FIGURES is replaced by spaced-apart flange members 282A and 282B. The spaced-apart flange members extend outwardly away from the bottom surface of the charging pack 260, along its length. The space formed between the flange members defines a slot 284. In this embodiment, the top housing section 222A include a flange member 242A that extends along the longitudinal axis of the charging well 140. Similarly, the bottom housing section 222B include a flange member 242B that extends along the longitudinal axis of the charging well 240. The flange member 242A and 242B are disposed at the front of the charging well and protrude slightly into the charging well 240. The flanges 242A and 242B are adapted to either contact or be disposed adjacent to one another when assembled as shown in FIG. 7B.

When the charging pack 260 is inserted into the charging well 240, the flange members 242A and 242B of respective housing sections 222A and 222B slide into the slot 284 formed by the spaced-apart flange members 282A and 282B of the charging pack 260. Once the charging pack 260 is fully inserted into the charging well 240, the space-apart flange members 282A and 282B of the charging pack 260 prevent the top housing section 222A from separating from the bottom housing section 222B, as shown best in FIG. 7B.

Referring back to FIGS. 3, 4 and 5, the back region 64 of the charging pack 60 includes a shelf portion 84 and an upright portion 86. The shelf portion includes a socket 88 disposed in the longitudinal direction of the charging pack 60. The socket 88 contains a conductive set of pins 90 that are electrically connected to charging cells 110 (shown in FIG. 6) located within the charging pack 60. Locating the conductive pins 90 within the socket 88 minimizes the likelihood that the user will inadvertently come into contact with the conductive pins. In the embodiment shown, the upright portion 86 is constructed orthogonal to the protruding shelf portion 84 to provide a flat surface to which a biasing member engages when the charging pack is positioned within the charging well of the defibrillator.

As shown in FIG. 5, the top region 66 of the charging pack 60 is substantially planer and maybe formed with a recessed region (not shown). The recessed region allows a label to be affixed to the top region 66 of the charging pack 60 without protruding above the top surface of the charging pack 60. The label may contain general information identifying the type of charging cells, a "use by" date, a part number, and date code, to name a few, if desired.

The internal construction of the charging pack 60 will be better appreciated with respect to the cross-sectional view of FIG. 6. As shown in FIG. 6, the body of the charging pack 60 is generally comprised of a cover 100 and a base 102. The cover 100 and base 102 are preferably formed of an injection-molded plastic and secured together via any conventional method, e.g., ultrasonic welding or adhesive bonding. It will be appreciated by those skilled in the art, however, that the cover 100 and base 102 may be formed of other materials. In the embodiment shown, the cover 100 is an elongate member that is substantially plate-like, and is positioned such that when secured to the base 102, forms the top region 66 of the charging pack 60.

The base 102 is generally V-shaped in cross section, and includes an inner upstanding wall 106 that, in conjunction with the back region 64 of the charging pack 60, defines an interior cavity 108. Mounted within the interior cavity 108 are a plurality of charging cells 110 held into place via molded structures in the base 102. The charging cells 110 can be either rechargeable or non-rechargeable cells, which are well know in the art and will not be described in further detail. The charging cells 110 are electrically connected in a conventional manner to a circuit board 112 mounted below the cover 100. Connected to the circuit board 112 in electrical communication with the charging cells 110 is the set of pins 90. The set of pins 90 define an electrical connector (see FIG. 12. element a) that mates with a corresponding electrical connector (see FIG. 12. element b) mounted within the charging well of the defibrillator. In the embodiment shown, the set of pins 90 protrudes downwardly into the socket 88 of the shelf portion 84.

While the electrical connector of the charging pack 60 has been described above and illustrated herein as a set of pins, it will be apparent to those skilled in the art that the electrical connector may be any known electrical connector operable to electrically connect the charging pack to the portable external defibrillator. Additionally, it will be appreciated to those skilled in the art that the placement of the electrical connector shown in the FIGURES is just one of the many possible locations for the electrical connector, and therefore should not be construed as limiting the present invention.

The base 102 also includes an outer upstanding wall 114 spaced apart from the inner upstanding wall 106 and remote from the interior cavity 108. The outer upstanding wall 114 extends from the bottom surface of the charging pack to just proximate the cover 100 to form the front surface of the charging pack 60. A space 116 is created between the bottom surface of the cover 100 and the top edge of the outer upstanding wall 114 so that a front portion 118 (having a smaller width dimension as the top of the base shown in FIG. 5) of the cover 100 is cantilevered about the inner upstanding wall 106. The amount of space created is designed such that the front portion 118 is prevented from over-traveling, which may cause damage to the latch. The inner wall 106 supports the cover 100. As described above, the outer upstanding wall 114 includes outwardly extending spaced-apart ridges 76 that provide a gripping surface to a user's finger when the charging pack 60 is pushed into place within the charging well.

Referring now to FIGS. 5 and 6, the latch 120 is formed by the cantilevered portion of the cover 100 and includes an actuation member in the form of a tab 122. The latch 120 is operable to secure the charging pack 60 within the charging well of the defibrillator. In the embodiment shown, the latch 120 includes a latch member 124 that engages with a slot disposed in the charging well of the defibrillator, as will be described in detail below. The latch member 124 includes a inclined leading face 128 (shown in FIG. 6) and a trailing face 130. The latch member 124 protrudes outwardly from the top surface of the charging pack 60 when in an extended position. Downward movement of the latch tab 122 causes a corresponding downward movement of the latch member 124, thereby retracting the latch member 124 below the top surface of the charging pack 60.

Figure 8:
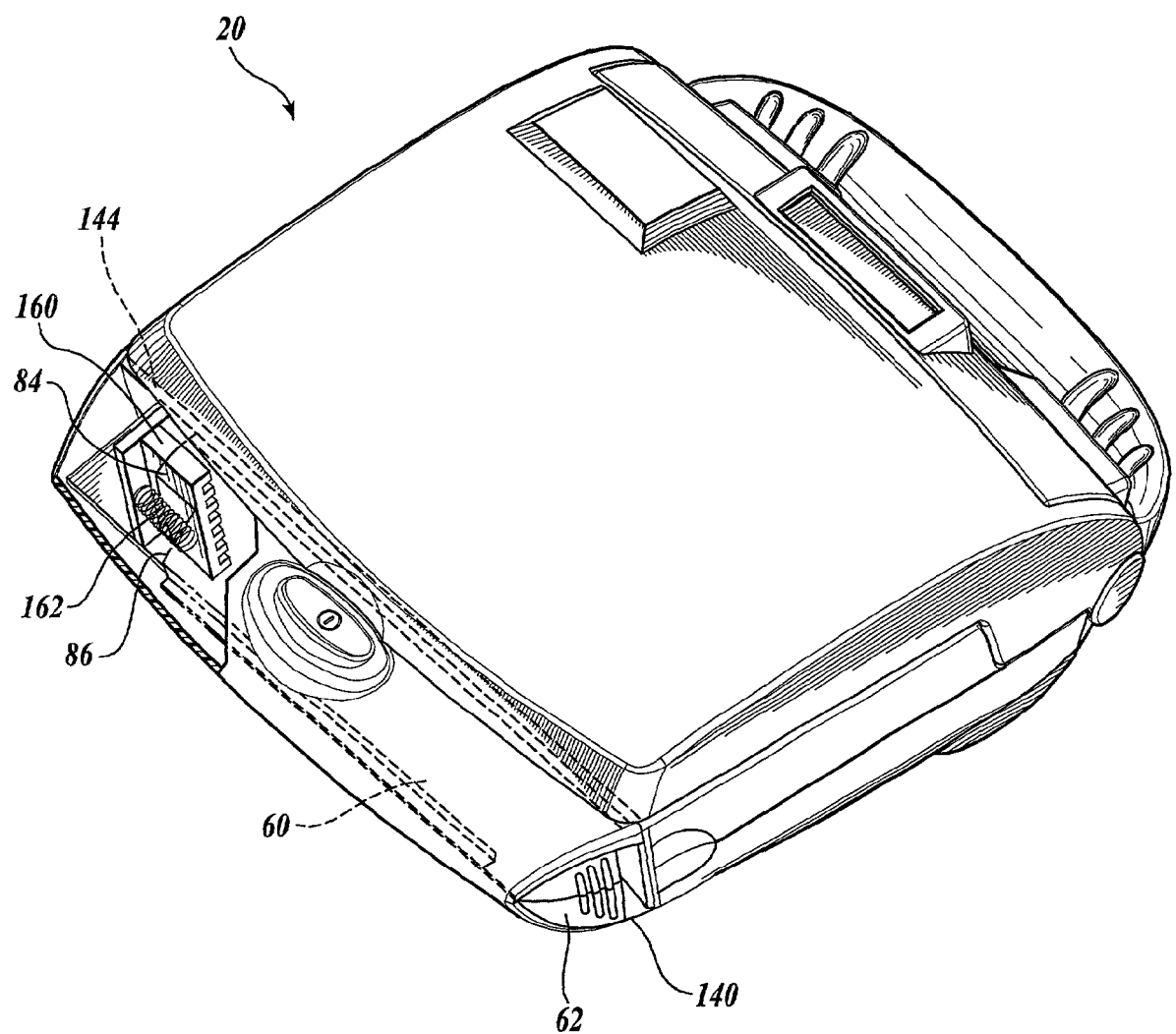
FIG. 8 is a partial cut-away view of the portable external defibrillator shown in FIG. 2, having the charging pack of FIG. 3 inserted therein.

Referring to FIGS. 7 and 8, the charging well 140 of one type of portable external defibrillator 20 briefly described above will now be described in detail. The geometry of the charging well 140 in cross section corresponds with the outer cross-sectional geometry of the charging pack 60 and is dimensioned slightly greater than the charging pack 60 so that the charging pack 60 is keyed to the charging well 140 of the defibrillator 20. This assures proper alignment of the charging pack 60 as the charging pack 60 is inserted into the charging well 140. The keying feature also prevents incorrect insertion of the charging pack 60 into the defibrillator 20. The depth of the charging well 140 is of suitable dimension so that the charging pack 60 nests entirely within the charging well 140, the front surface of the pack 60 being flush with the side of the defibrillator 20.

Referring to FIGS. 8 and 9, the charging well 140 includes an upstanding side wall 144 that is positioned adjacent to the top surface of the charging pack 60 when the charging pack is inserted. As best shown in FIGS. 9-11, the side wall 144 is formed with a slot 148. The slot 148 is suitably dimensioned to receive the latch portion 124 of the charging pack 60 when the charging pack 60 is completely inserted into the charging well 140. Located outwards of the slot 148 is an outer wall portion 150 of the side wall 144, which will engage with the latch portion 124 when the charging pack 60 is inserted into the charging well 140.

While the latch 120 of the charging pack 60 has been described above and illustrated herein to include a latch member for securing the charging pack 60 within the charging well, it will be apparent to those skilled in the art that the latch 120 may have alternative configurations for securing the charging pack within the charging well. In one embodiment, the latch 120 may omit the latch member 124. In this embodiment, the latch may be configured such that when inserted, the friction generated between the top surface of the latch 120 and the side wall 144 of the charging well 140 retains the charging pack 60 therein. Alternatively, the latch 120 may include a slot instead of the latch member 124. In this embodiment, the side wall 144 of the charging well 140 is provided with a latch member similar to that of latch member 124 described above for engagement within the slot of the latch 120.

Referring now to FIG. 8, the charging well further includes an electrical connector 160 and a biasing member 162 mounted at the rear of the charging well. The electrical connector 160 is adapted to connect with the set of pins 90 (shown in FIG. 4) positioned within the socket of the charging pack 60. The biasing member 162 engages the upright portion 86 of charging pack 60 when the charging pack 60 is fully inserted into the charging well 140.

When the charging pack 60 is nearly fully inserted into the charging well 140, the electrical connector 160 mounted at the rear of the charging well 140 is received by the socket 88 (shown in FIG. 5) in the shelf portion 84 of the charging pack 60. While the connector 160 mounted at the rear of the charging well 140 is received by the socket in the back of the shelf portion 84, the upright portion 86 of the charging pack 60 pushes against the biasing member 162 of the charging well 140, placing the biasing member 162 in a loaded or cocked position. The electrical connector 160 is specifically designed to mate with the conductive pins 90 (shown in FIG. 4) in the charging pack 60. The construction of the charging well 140 and the charging pack 60 ensure that the mating of the corresponding pins is automatically performed as the charging pack 60 is inserted fully into the charging well 140, without requiring the user to align the charging pack. The alignment provided by this mating feature ensures that the pins on the charging pack 60 will not be broken or bent as the charging pack 60 is inserted into the defibrillator 20.

Referring now to FIGS. 9-11, to prevent the charging pack 60 from falling out of the charging well once it has been inserted, latch 120 is designed to automatically secure the charging pack 60 within the charging well 140. As the charging pack 60 is slid into the charging well 140, as shown in FIG. 9, the leading face 128 of the latch member 124 comes into contact with the outer wall portion 150 of the side wall 144. The leading face 128 of the latch member 124 is angled so that as the charging pack 60 is further inserted into the charging well 140, the latch member 124 is automatically forced in the direction of the bottom 74 of the charging pack 60 as the leading face 128 contacts the outer wall portion 150 of the side wall 144, as shown in FIG. 10. A user therefore does not have to move latch 120 when inserting the charging pack 60, since the displacement of the latch member 124 is automatically performed.

Referring now to FIG. 10, as the charging pack 60 nears the position illustrated, the latch member 124 continues to travel along the outer wall portion 150. Again, the angled leading surface 128 of the latch member 124 causes the latch 120 to move as the latch member 124 travels along the outer wall portion 150. After traveling along the outer wall portion 150, the latch member 124 is forced into the slot 148 by the biasing action of the cantilevered latch 120, as best shown in FIG. 11. As will be appreciated by those skilled in the art, the cover 100 (FIG. 6) that forms the latch 120 is constructed from a suitable material such that when the latch 120 is displaced, the cover 100 creates a sufficient biasing force to return the latch 120 to the non-displaced or extended position. When the latch member 124 is captured in the slot 148, the trailing face 130 of the latch member 124, which is generally flat, is brought into contact with the flat outward side of the slot 148. The contact between the latch member 124 and the flat outward side of slot 148 secures the charging pack 60 in place, and prevents the charging pack 60 from becoming separated from the defibrillator 20.

To remove the charging pack 60, a user must apply a force in the direction of the bottom of the charging pack 60 onto tab 122 to retract the latch member 124 from the slot 148. Displacing the tab 122 lowers the latch member 124 so that the trailing face 130 of the latch member 124 clears the flat outward side of the slot 148. As the tab 122 is displaced, the charging pack 60 is automatically thrusted outwardly from the defibrillator 20 due to the biasing force of the loaded or cocked biasing member 162 (shown in FIG. 8) against the back upright portion 86 of the charging pack 60. Once the latch member 124 clears the flat outward side of the slot 148, the user may return the latch 120 to the extended position.

While the preferred embodiment of the invention has been illustrated and described, it will be appreciated that various changes can be made therein without departing from the spirit and scope of the invention. For example, the number of charging cells can vary depending on the required operation voltage of the defibrillator. Additionally, while the charging pack was shown having a generally triangular cross section, other cross-sectional geometries, such as circular or rectangular to name a few, are to be within the scope of the present invention. It will be appreciated that as the cross-sectional geometry of the charging pack changes, the shape of the charging well may also change accordingly. Further, the electrical connector is shown at the rear of the charging pack; however, it may be located anywhere on the body, as desired.

The embodiments of the invention in which an exclusive property or privilege is claimed are defined as follows:

1. A portable electronic medical device for use with electrodes, comprising:
   a housing with a well formed thereon;
   an energy storage device in the housing for storing energy that can be transferred to the electrodes; and
   a rechargeable power source in the housing for storing energy that can be transferred to the energy storage device,
   in which the well is configured to receive a selectively removable portable standalone charging apparatus including a charging device, and
   if the selectively removable portable standalone charging apparatus is inserted into the well, the charging device is operable to recharge the power source.

2. The medical device of claim 1, further comprising:
   an electrical connector adapted for connection with a cooperative electrical connector of the charging apparatus for the recharging.

3. The medical device of claim 1, in which
   the well has a generally triangular cross-section.

4. The medical device of claim 1, in which
   a latch is operable to secure the portable standalone charging apparatus in the well.

5. The medical device of claim 4, in which
   the latch is movable between an extended position and a retracted position,
   the latch biased towards the extended position, and
   partial insertion of the charging apparatus into the well causes the latch to move to the retracted position, the latch returning to the extended position after the charging apparatus is fully inserted into the well.

6. The medical device of claim 5, further comprising:
   a biasing member, and
   in which when the latch is moved to the retracted position, the biasing member exerts a force for ejecting the charging apparatus from the well.

7. The medical device of claim 1, in which
   the energy storage device in the housing comprises at least one capacitor.

8. A portable, stand-alone charging apparatus for insertion into a well of a portable electronic medical device, the medical device including an energy storage device for storing energy for use by electrodes, and a rechargeable power source for storing energy for use by the energy storage device, the charging apparatus comprising:
   a body configured to be inserted within the well; and
   a charging device housed substantially within the body and operable to recharge the power source when the body has been inserted into the well.

9. The apparatus of claim 8, further comprising:
   an electrical connector adapted for connection with a cooperative electrical connector of the portable electronic device for the recharging.

10. The apparatus of claim 8, in which
    the body has a generally triangular cross-section.

11. The apparatus of claim 8, in which
    a latch is operable to secure the body in the well.

12. The apparatus of claim 11, in which
    the latch is movable between an extended position and a retracted position,
    the latch biased towards the extended position, and partial insertion of the body into the well causes the latch to move to the retracted position, the latch returning to the extended position after the body is fully inserted into the well.

13. The apparatus of claim 12, in which
the latch includes a latch member that protrudes from the body when the latch is in the extended position, but does not protrude from the body when the latch is in the retracted position.

14. The apparatus of claim 8, in which
the energy storage device comprises at least one capacitor.

15. An assembly comprising:
a portable electronic medical device for use with electrodes, the portable electronic medical device comprising:
   a housing with a well formed thereon,
   an energy storage device in the housing for storing energy that can be transferred to the electrodes, and
   a rechargeable power source in the housing for storing energy that can be transferred to the energy storage device; and
   a selectively removable portable standalone charging apparatus including a charging device inserted into the well, wherein the charging device is operable to recharge the power source.

16. The assembly of claim 15, in which
the portable electronic medical device includes an electrical connector adapted for connection with a cooperative electrical connector of the charging apparatus for the recharging.

17. The assembly of claim 15, in which
the well has a generally triangular cross-section.

18. The assembly of claim 15, in which
a latch is operable to secure the portable standalone charging apparatus in the well.

19. The assembly of claim 18, in which
the latch is movable between an extended position and a retracted position,
the latch biased towards the extended position, and
partial insertion of the charging apparatus into the well causes the latch to move to the retracted position, the latch returning to the extended position after the charging apparatus is fully inserted into the well.

20. The assembly of claim 19, in which
the portable electronic medical device includes a biasing member, and
when the latch is moved to the retracted position, the biasing member exerts a force for ejecting the charging apparatus from the well.

21. The assembly of claim 15, in which
the energy storage device in the housing comprises at least one capacitor.

* * * * *